(12) United States Patent
Wilson

(10) Patent No.: US 10,201,121 B1
(45) Date of Patent: Feb. 12, 2019

(54) PREDICTION OF AMOUNT OF CROP OR PRODUCT REMAINING FOR FIELD

(71) Applicant: Ag Leader Technology, Ames, IA (US)

(72) Inventor: David Wilson, Ames, IA (US)

(73) Assignee: Ag Leader Technology, Ames, IA (US)

( * ) Notice: Subject to any disclaimer, the term of this patent is extended or adjusted under 35 U.S.C. 154(b) by 274 days.

(21) Appl. No.: 15/057,229

(22) Filed: Mar. 1, 2016

(51) Int. Cl.
*A01B 79/00* (2006.01)
*G05B 13/02* (2006.01)

(52) U.S. Cl.
CPC .......... *A01B 79/005* (2013.01); *G05B 13/026* (2013.01)

(58) Field of Classification Search
CPC ............................ A01B 79/005; G05B 13/026
USPC .................................. 700/275; 701/50, 533
See application file for complete search history.

(56) References Cited

U.S. PATENT DOCUMENTS 8,600,629 B2 * 12/2013 Zielke .................. A01B 79/005
  111/200
8,781,693 B2 * 7/2014 Woodcock .......... A01M 7/0089
  701/50

* cited by examiner

*Primary Examiner* — Bo Fan
(74) *Attorney, Agent, or Firm* — McKee, Voorhees & Sease, PLC

(57) ABSTRACT

A method for managing agricultural operations by predicting amount of crop or product remaining for a field includes performing agricultural operations on at least a portion of a field using an agricultural machine, sensing data associated with the agricultural operations using sensors associated with the agricultural machine, communicating the data associated with the agricultural operations to a computing device, analyzing the data associated with the agricultural operations performed using the computing device to determine an area prediction for a remaining portion of the field upon which the agricultural operations are to be performed, and using the area prediction for the remaining portion of the field by the computing device to determine a time associated with completing the agricultural operations for the field or an amount of material or other resources associated with completing the agricultural operations for the field.

20 Claims, 6 Drawing Sheets
(4 of 6 Drawing Sheet(s) Filed in Color)

# PREDICTION OF AMOUNT OF CROP OR PRODUCT REMAINING FOR FIELD

FIELD OF THE INVENTION

The present invention relates to agriculture technology. More specifically, but not exclusively, the present invention relates to determining the amount of crop or product remaining in a field or determining an amount of an agricultural input yet to be applied to a field.

BACKGROUND OF THE ART

For purposes of discussion, problems in the art are discussed with respect to harvesting grain from a field. It is to be understood that although such discussion is useful for background purposes, the present invention is not necessarily limited to this application as there are applications to both removing a crop or product from a field as well as adding an agricultural input to a field.

One of the determinations that is needed during harvest is a determination of how much grain is left in the field. This is useful for scheduling and logistics purposes. Currently, a combine harvester operator can estimate how much grain is left in the field by looking at the area remaining and the average yield, and making an estimate or guess. Once this guess is made the combine operator can communicate over phone (e.g. cell phone), 2-way radio communications, or otherwise this information to other people associated with the harvest operations such as those towing grain wagons or driving grain trucks, those operating augers associated with grain bins or other on-farm storage, local grain elevators, operators of other combines, or any other person associated with the harvesting process. It is not particularly easy to communicate this information or even determine it in the first place. The problems are increased when the complexities of harvest operations increase such as by number of combines, grain wagons, grain trucks, etc.

With respect to the problem of determining an estimate regarding the amount of grain remaining, there tends to be errors for a variety of reasons. Some non-limiting examples are as follows. Aside from errors arising in the estimation of the amount of grain left in the field, there may be errors in the estimating how much grain is in the combine grain tank and in the auger wagon. Moreover, the operator needs to focus their attention on combining the field, so attempting to make even rough estimates is problematic. Of course, when there are multiple combines and auger wagons within the same field the complexities increase. Further, there can be added complexities when a determination is being made regarding how much grain is left in a given portion a field as opposed to the entire field.

Yet, having accurate estimates would be useful from a logistics standpoint, including but not limited to crop/product marketing/management decisions or other management decisions. If an accurate estimate was available, this may prevent trucks from driving to the field which ultimately are not needed or not having enough trucks to convey grain, or making incorrect decisions regarding whether the additional grain left will fill a grain bin or dryer. Thus, accurate estimates would be useful to drive better management decisions and reduce costs, as well as prevent unnecessary contribution to ground compaction issues caused by auger wagons traveling to unnecessary locations. What is needed is to provide a more reliable method and apparatus for determining an amount of crop or product remaining in a field or an area thereof.

SUMMARY OF THE INVENTION

Therefore, it is a primary object, feature, aspect, or advantage of the present invention to improve over the state of the art.

It is a further object, feature, aspect, or advantage of the present invention to determine how much grain or product remains in a field.

It is a still further object, feature, aspect, or advantage of the present invention to provide information that can lead to better management decisions.

Another object, feature, aspect, or advantage of the present invention is to improve logistics operations associated with agricultural activity.

Yet another object, feature, aspect, or advantage of the present invention is to reduce vehicle traffic within a field so as to avoid unnecessary contributions to ground compaction.

It is a further object, feature, aspect, or advantage to perform agricultural operations in an orderly and efficient manner without rushing and avoiding safety issues associated with rushing.

One or more of these and/or other objects, features, aspects, or advantages will become apparent from the specification and claims that follow. No single embodiment need have each and every object, feature, aspect, or advantage and different embodiments may have different objects, features, aspect, or advantages.

According to one aspect, a method for managing agricultural operations by predicting amount of crop or product remaining for a field includes performing agricultural operations on at least a portion of a field using an agricultural machine, sensing data associated with the agricultural operations using sensors associated with the agricultural machine, communicating the data associated with the agricultural operations to a computing device, analyzing the data associated with the agricultural operations performed using the computing device to determine an area prediction for a remaining portion of the field upon which the agricultural operations are to be performed, and using the area prediction for the remaining portion of the field by the computing device to determine a time associated with completing the agricultural operations for the field and/or an amount of material associated with completing the agricultural operations for the field.

According to another aspect, a method for managing harvest operations by predicting amount of crop or product remaining for a field, the method includes performing harvesting operations on at least a portion of a field using a harvesting machine, sensing data associated with the harvesting operations using sensors associated with the harvesting machine, communicating the data associated with the harvesting operations to a computing device, determining an amount of harvested material associated with completing the harvesting operations for the field using the computing device, determining an amount of harvested material onboard the harvesting machine and communicating the amount of harvested material onboard the harvesting machine to the computing device, and determining an amount of harvested material stored in one or more agricultural vehicles and communicating the amount of the harvested material stored in the one or more agricultural vehicles to the computing device. The method further includes using the amount of harvested material associated with completing the harvesting operations, the amount of harvested material onboard the harvesting machine, and the amount of harvested stored in one or more agricultural vehicles to determine at least one of a time to complete the harvesting operations and remove the harvested material from the field to a destination, a number of wagon (or analogous transport) loads associated with removing the harvested material from the field to the destination, and a number of truck (or analogous transport) loads associated with removing the harvested material from the field to the destination.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EXEMPLARY EMBODIMENTS OF THE INVENTION

A. Overview

For a better understanding of the invention and its aspects, several illustrative examples of forms or embodiments the invention can take will now be described in detail. It is to be understood these embodiments are neither inclusive nor exclusive of all forms the invention can take.

As will be well-appreciated by those skilled in the art, the equipment, hardware, and other physical components are commercially-available and well-known, and therefore will be mentioned generically. For example, computerized/digital precision farming systems having programmable capabilities, human-machine interfaces, and digital display monitors are well-known and becoming ubiquitous in large-scale grain farming.

The embodiments will focus on apparatus, systems, and methods of estimating remaining grain to be removed from a field. However, as indicated throughout, these apparatus, systems, and methods can be applied in analogous ways to other estimations related to agricultural fields.

Currently the combine operator will estimate how much grain is left in the field by looking at the area remaining and the average yield, and then over the phone or 2-way radio communicate this information to the remaining people in the operation. It is not easy for the combine operator to communicate this information, nor is it easy to calculate this final bushel number. There is always error in grain remaining but also in how much grain is in the combine grain tank and auger wagon. This is difficult to estimate when one is engaged in the harvesting process. There is much added complexity when there are multiple combines and auger wagons running in the same field. Further complexity can be added when one wants to determine how much area/product is left in a given area of the field and not the entire field. This determination may be desirable when an operator wants to finish a specific area of a field and not necessarily the entire field.

In the end, the farming operations can save un-needed trucks from driving to the field, not having enough trucks, and/or understanding how much more grain will fill the bin/dryer. All of this allows them to plan better and thus make better management decisions. As well as save possible ground compaction with auger wagons traveling to unnecessary locations.

B. Exemplary Apparatus and System

Figure 1:
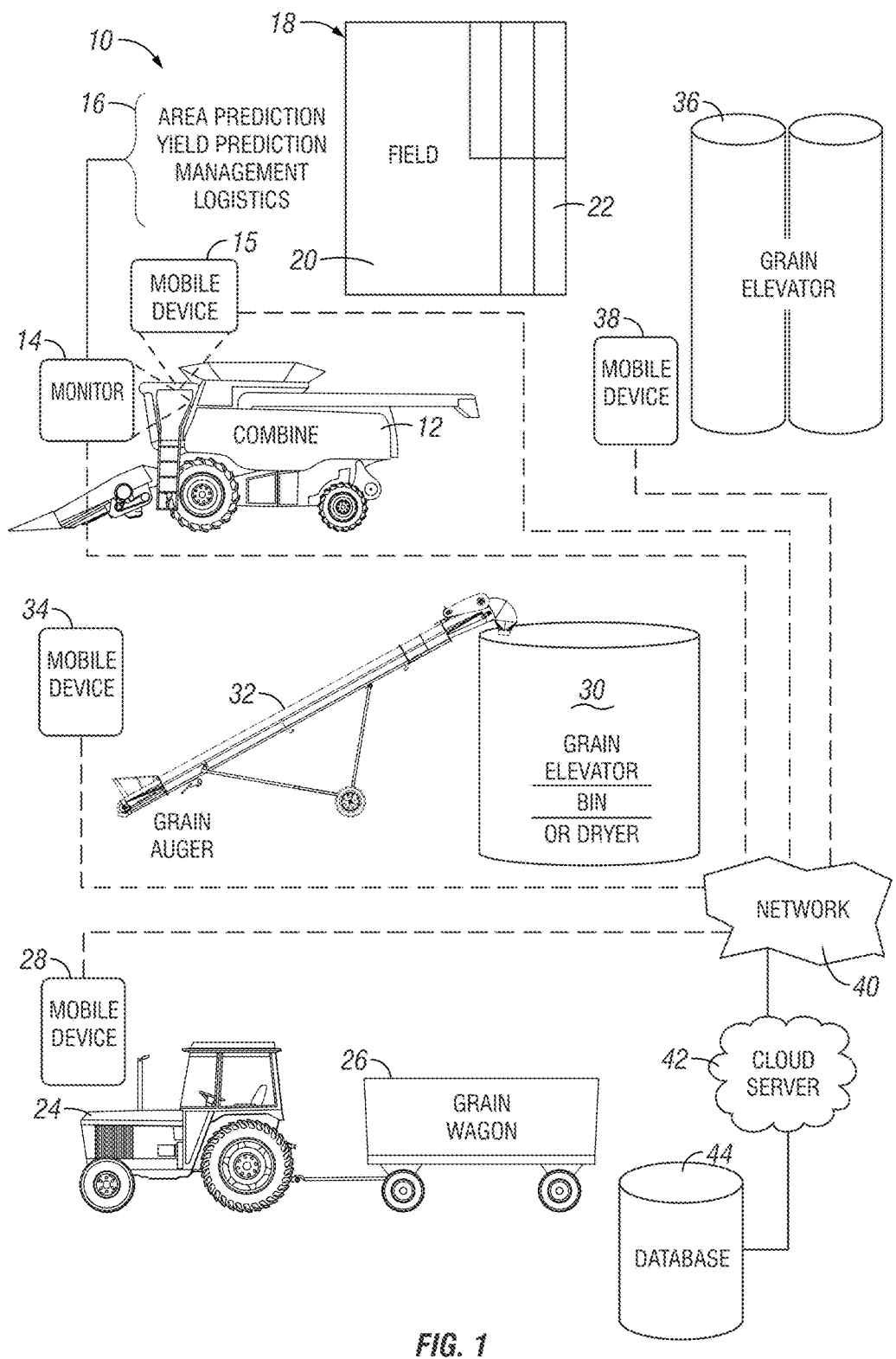
FIG. 1 is a pictorial representation according to one aspect of the present invention.

According to one aspect, a farming operation including those involved such as a combine driver, auger wagon driver, grain truck driver, and/or farm grain elevator personnel, are provided with a prediction or estimate of how much grain or material is left to be hauled out of a field. FIG. 1 illustrates an overview of one aspect of the invention. A system 10 is shown. A farm vehicle in the form of a combine 12 is shown. There is a monitor 14 associated with the combine 12. The monitor 14 is configured for performing, inter alia, area prediction, yield prediction, and performing management of logistics. Commercially available monitors and software of this type include the InCommand™ and SMS™ brands from Ag Leader Technology of Ames, Iowa (USA). See also discussion of yield monitors, displays, and other sensors in U.S. Pat. No. 9,043,096 to Ag Leader Technology, incorporated by reference herein. The combine 12 is operating within a field 18 which includes an unharvested portion 20 and a harvested portion 22. A mobile device 15 (e.g. cell phone, two-way radio, or the like) can be with the combine or combine operator.

An agricultural vehicle in the form of a tractor 24 is shown which is towing a grain cart or wagon 26. Vehicle 24 could take other forms (e.g. semi-truck). A mobile device 28 may be used by the operator of the tractor 24. Combine 12 can off-load harvested grain from its on-board grain bin to grain wagon 26 and the tractor operator can maneuver wagon 26 to appropriate position at the combine when mobile device 28 is called upon via mobile device 15 by the combine operator, and then transport that load to storage. Similarly, a grain wagon (like grain wagon 26 or some other transport vehicle, e.g., a self-powered grain cart, truck, or semi tractor-trailer) may be used to convey grain from the field to another location and a mobile device (like device 28) may be used by the operator of the operation of or associated with that transport. An example of storage is an on-farm or local grain bin or elevator storage 30 and is shown in FIG. 1 along with a grain auger 32 (to move grain off-loaded from wagon 26 (or other transport vehicle) into elevator 30 (or bin or dryer)). A mobile device 34 is shown which may be used by a person at the location of the grain bin, elevator, dryer, or other storage 30.

Also shown in FIG. 1 is a large grain elevator 36 (e.g. for massive storage and can on-farm such as a cooperative or commercial grain storage company). A mobile device 38 is shown which may be used at the grain elevator 36. The various mobile devices shown may, for example, send and receive data through cellular connections or other types of wireless (e.g. two-way radio) communications. At least parts of the communication links could be wired (e.g. land-line telephone). The form of communication can vary but can include any way to communicate between separated persons or locations either voice, text, or data effective to convey needed information between those persons. Non-limiting examples are voice, voice mail, text messaging, proprietary data formats, and email over a communications network.

A network 40 is shown which may be a telecommunications network such as the internet. A cloud server 42 is shown which is operatively connected to the network 40. A database 44 is shown which is in operative communication with the cloud server 42. The system may use historic data from the cloud or data stored locally (or otherwise available) to help predict what the yield will be on the crop that is yet to be harvested. Examples of historical data may include normalized yield data, multiple years of yield, soil type, soil properties (such as, but not limited to, cation exchange capacity (CEC), pH level, nitrogen level, organic matter, P1), rain fall data (spatial or static), growing degree days, planting performance issues in different areas of a field, where different varieties were planted in the field, application of fertilizer to different areas of the field, planting date, aerial imagery from satellites, planes, or unmanned aerial vehicles (UAVs), and other data regarding the field or conditions associated with the field that may affect yield for the field. Such data is well-known to those skilled in the art and is frequently collected and digitally stored for later use by agricultural producers. See US 2016/0019560 to Raytheon Co., incorporated by reference herein, for a discussion of at least some of these types of historical data. Where such data is available for multiple years it is contemplated that data from a year which is most comparable to the current year in key aspects may be used or may be weighted more heavily than data from other years. Although information may be made available through the cloud server 42, it is contemplated that data may also be stored locally on mobile devices, on electronic equipment associated with the agricultural vehicles or otherwise. It is also contemplated that a system such as a yield monitoring system may store data locally as it is obtained which may also be used in predicting yield for the unharvested portion of the field. Similarly, collected yield data may also be sent in real-time to the cloud or other system which may use this data and other data to make yield predictions for the remaining portions of the field. It is also contemplated that additional predictions may also be made. For example, moisture predictions for the unharvested portions of the field may be made based on moisture readings for other portions of the field, weather data, historical data, and other data.

In operation, those involved in the farming operation including the combine driver, auger wagon driver, grain truck drivers, management, and/or farm grain elevator personnel are provided with a prediction of how much grain/material is left to be hauled out of a field. The following example is illustrative. A typical precision farming system (e.g. yield monitor) continuously derives from information available to it, and thus essentially knows from current area harvested and boundary size that, in this example, there are 20 acres left to harvest with a field average yield of 200 bu/ac, thus totaling 4,000 bushels. The system can present this on a display or monitor 14 associated with the system. The system also can derive or know that there are, in this example, 200 bushels in the grain tank of the combine, and 800 bushels on the auger wagon. Therefore a total of 5,000 bushels needs to be hauled away from the field to finish it. This means the operation needs to have 5 more trucks come to the field where each truck holds 1,000 bushels. This also means the grain facility coordinator needs at least 5000 bushels of room left in the bin to hold all of the grain (excluding trucks that are already full or currently unloading). Thus, being able to determine how much grain is left in the field may be used in conjunction with other information to assist in logistics, scheduling, and resource management.

C. Exemplary Operation

Figure 2:
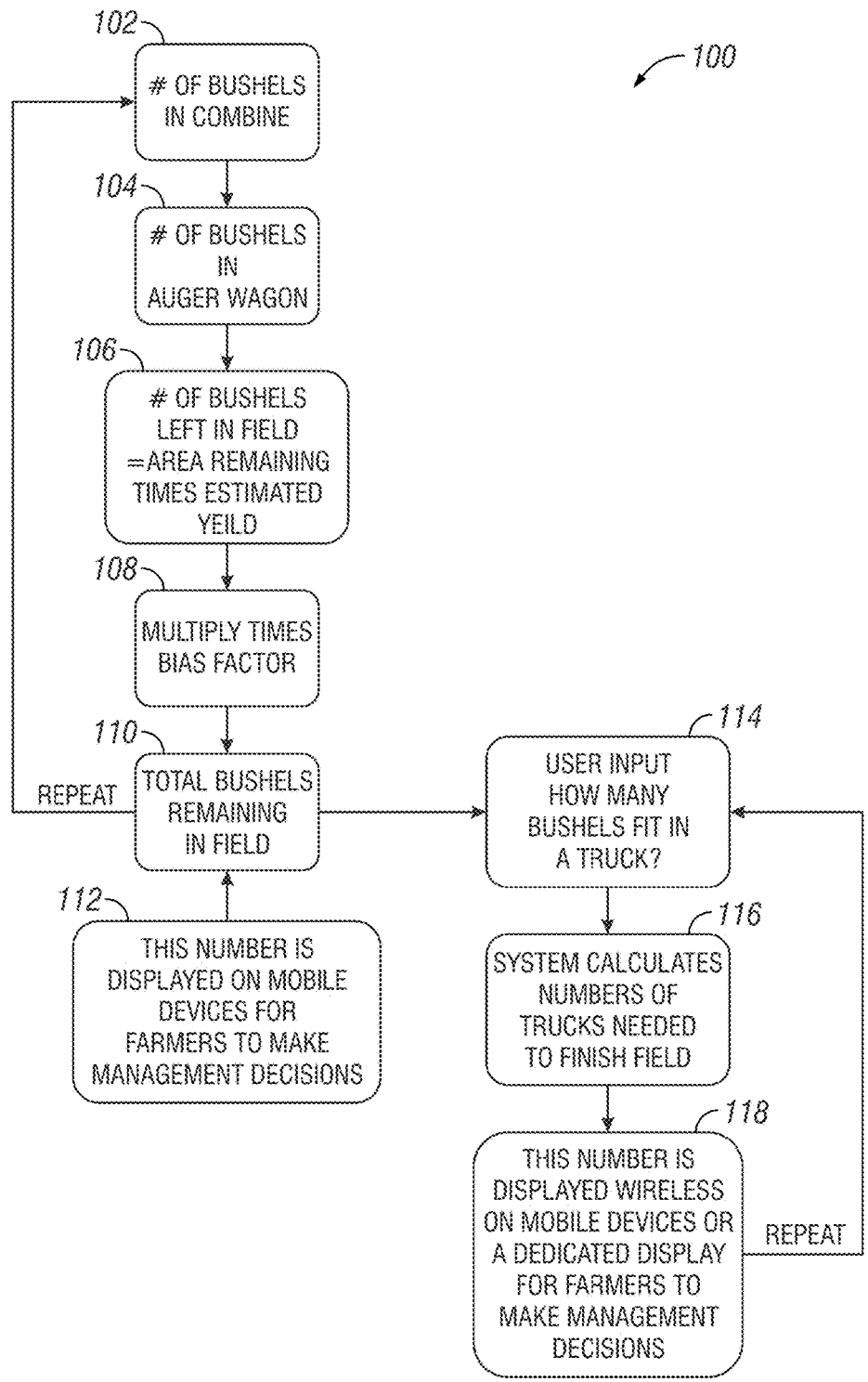
FIG. 2 is a flow diagram showing one example of a method according to the invention.

FIG. 2 illustrates one example of a methodology 100. In step 102, the number of bushels within a combine is determined. In step 104, the number of bushels in an auger wagon is determined. In step 106, the number of bushes left in the field is determined. This may be determined by estimating the area remaining in the field to be harvested and an estimated yield for the area remaining in the field. In step 108 the result may be multiplied by a bias factor. The bias factor may be based on an operator-entered value so that an operator can adjust for any factors not taken into consideration by the system and the system can take advantage of operator knowledge and experience. Thus, the operator has the opportunity to adjust the system for inaccuracies associated with yield calibration, area remaining, or other calculations. For example, if the operator notices that in every field the system is off by a certain percentage the operator can adjust the bias factor. The system may provide for automatically computing a bias factor based on the results of operations associated with other fields and then allowing the operator to modify or change the bias factor. The bias factor can be applied to area, crop/product remaining to collect, or product to apply.

Next in step 110 the total number of bushels remaining in the field is calculated. The process shown in steps 102 to 110 may be repeated any number of times in order to continuously update the total number of bushels remaining in the field. In step 112 the number of bushels remaining may be displayed on a mobile device in order to assist a farmer in making management decisions. In addition, in step 114 user input may be received regarding how many bushels/weight will fit into a truck or wagon knowing the operation may have a combination of different truck/trailer/wagon sizes, each of which may have different weight restrictions based on licensing/# of axles, permits, and special circumstances. In step 116 the system may calculate the number of trucks needed to finish the field. In step 118 the number of trucks needed to finish field may be displayed wirelessly on mobile devices in order to assist a farmer in making management decisions. Examples of management decisions may include whether to continue working or to stop and continue on a different day, whether to send more trucks to the field and if so how many more, whether to reallocate resources to a different field or location, and other decisions regarding the allocation or reallocation of resources.

As indicated at step 118, some of the involved persons or entities can, instead of mobile devices (cell phones, smart phones, tablet computers, lap top computers, two way mobile radios), have dedicated displays or communication devices (e.g. desktop computer, smart TV, internet terminal, built in two way radio, precision ag display, etc.) and obtain the communications that way. The same might be true for the other entities involved.

Additional discussion of application and operation of aspects according to the invention will be set forth with the several specific examples that follow.

D. Example 1

Figure 3:
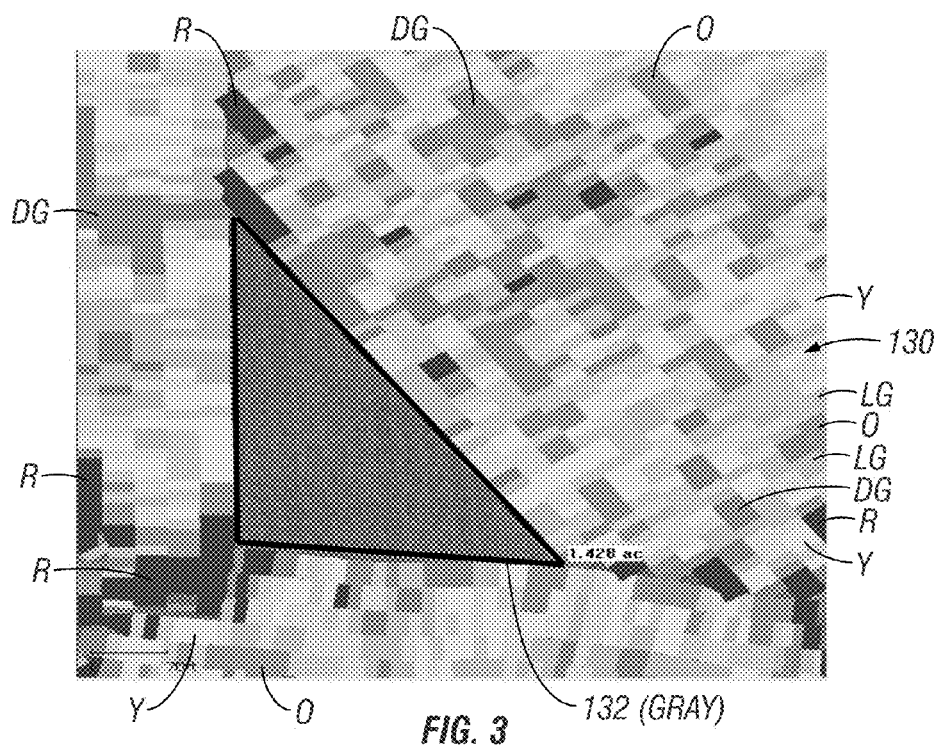
FIGS. 3-4 are digitized plan views of a field on a digital display which also illustrate a measurement technique of an unharvested area within a field.
Figure 4:
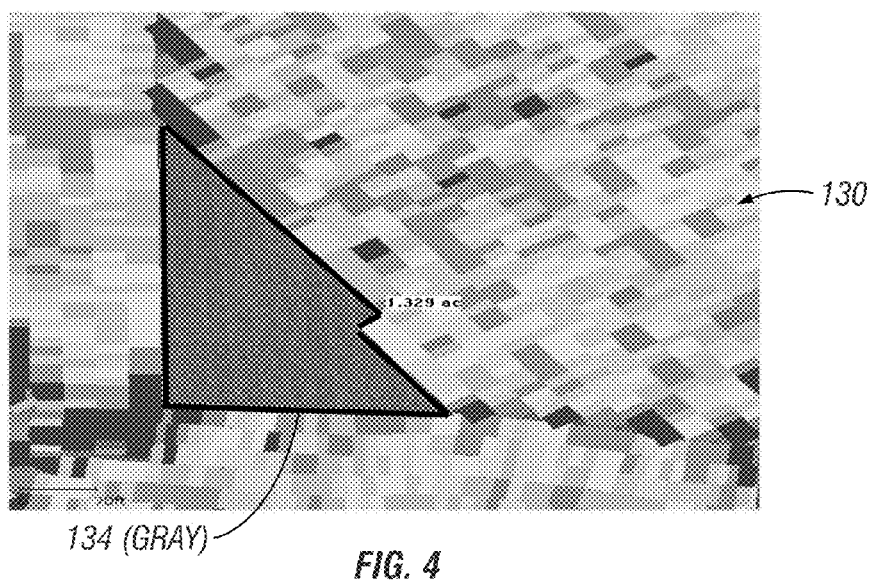

FIG. 3 illustrates by aerial plan view a field 130 digitally represented on a monitor display with an unharvested area 132 graphically indicated on the display. Based on the geometry and dimensions of the unharvested area the area 132 can be calculated. This can be done by the monitor system by programming and using inputs values such as previously harvested/applied area, swath width, speed, and GPS location. By using this data the system in real time can precisely calculate the area remaining every few seconds. The resolution, accuracy, and precision of the unharvested area can be within the resolution, accuracy, and precision of the technique used to identify the unharvested area. But cruder estimates of area 132 can be made and utilized. For example, if appropriately programming, the person at the display might be able to draw an outline (e.g. by touchscreen drawing tools) of the unharvested portion of the field displayed, as a rougher estimate of that area. The programming might allow the person to designate that area as "unharvested" and either select or allow the programming to automatically fill that area with some visually or otherwise perceivable indication distinct from other parts of the field. In the example of FIGS. 3 and 4, area 132 is basically a regular polygon or close to it, has a darker border and an interior area filled with a visually distinguishable shading or solid color. Other or alternative indicia is possible (e.g. text, symbols, uneven coloring, just a border, etc.). For example, if a user only plans on harvesting/applying a portion (e.g. half) of the polygon in FIG. 3, then the user can draw this on the image and the system will indicate the area remaining, and calculate the remaining product left to apply/collect. Examples may include a good stopping point before a rain, or where the crop way be wetter due to a later planting date and therefore an interested party does not want to harvest the entire field.

While likely giving less accurate estimates, the methodology of the invention could still be advantageously utilized in managing logistics and resources. It could still produce a reasonable estimate of unharvested area, which could be converted to a reasonable (at least for some uses) estimate of remaining volume or amount of crop to harvest from that area, and which, in turn, could be used to assist in logistics and resources for finishing the harvesting of the field, as well as additional down-the-line decisions (e.g. as suggested in FIGS. 1 and 2). As can be seen in FIGS. 3 and 4, the harvested area of the field has small sub-areas colored to represent yield in bushels per acre for each sub-area. Lower yields are indicated by red (R), medium yields by orange or yellow (O or Y), and higher by light green or dark green (G). As shown, the display gives a distance scale bar (lower left corner) and a calculated area estimate for the unharvested areas (e.g. 1.428 acres for FIG. 3, and 1.329 acres for FIG. 4) based on the boundaries. Knowing those areas, and the actual estimates of yield (correlated to the color codes) for the rest of the field, the programming can calculate an estimated average predicted yield for the unharvested area. The designer can decide to take a raw average yield for the harvested area and make the assumption this is sufficient to use in estimating yield times area for the unharvested area. It is also possible for the designer to weight or otherwise use a different yield value. There may be times when the yield monitor indicates it is likely the unharvested area will produce a yield on the lower end of those experienced in some sub-areas of the harvested part of the field. An example might be if the yields all around the unharvested area are on the lower end, then it might indicate the same for the unharvested area. This is a matter of design choice.

Furthermore, as discussed above, the calculated estimate of remaining crop to harvest can be displayed for decisions and action by those involved in the process. For example, it can be displayed to the combine operator, who can plan, summon, or call off further vehicles. It can be displayed to (e.g. including concurrently with the combine operator or others) the operator of tractor 24 to help that person plan. The same can be true if the system is configured to allow concurrent display to all mobile devices (or other communication devices) for the different involved persons, locations, or entities.

FIG. 4 illustrates the same field 130 but with a smaller unharvested area 134. It is contemplated that this type of instantaneous and accurate area calculation allows various management decisions to be better made. For example, this area 134 may inform the operator if the rest of the crop will fit on the combine and, thus, the auger wagon does not need to drive back to this area of the field. This can result in fuel savings, time savings, reduce the amount of compaction in the field from unnecessary auger wagon trips, and better use of human resources.

This also allows the system to inform the operator if there is enough product (e.g. seed, fertilizer, etc.) on the machine to finish this area of the field. By essentially analogous application of principles of these examples used for estimating what is left to be harvested from a field, estimations can be made if a machine (e.g. planter, fertilizer applicator, etc.) has enough product on-board to finish off remaining areas of a field. Present-day precision farming systems can include monitors/displays that track amount of product applied to a field (e.g. seed, fertilizer, etc.). By knowing or estimating how much has already been used/applied on a field to an estimation of what area of the field is left, and knowing or estimating on-board product carrying capacity, decisions can be made periodically or continuously on utilization of resources. For example, if on-board inventory of the product is sufficient to finish off the field, a transport vehicle to re-load the machine with more product will not need to be summoned. It will reduce time, costs, and possible soil compaction. Or if estimations show more product will be needed, it can be summoned ahead of time so there is minimum down-time or interruption in the application process to finish the field. Sometimes replenishment of such product is not locally available and must be ordered from a third party and/or transported a substantial distance.

This technique can, again, save time and resources logistically.

E. Example 2

Figure 5:
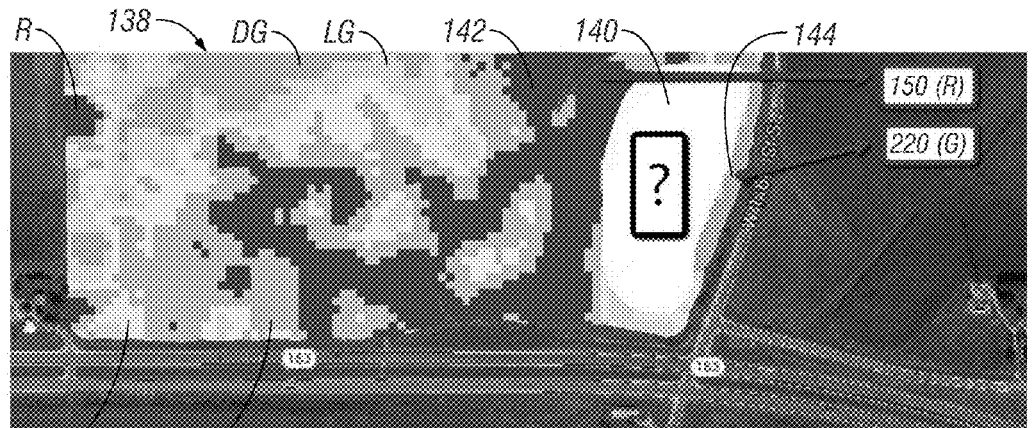
FIGS. 5-7 are digitized plan views of a field on a digital display which also illustrate yield maps for the field.
Figure 6:
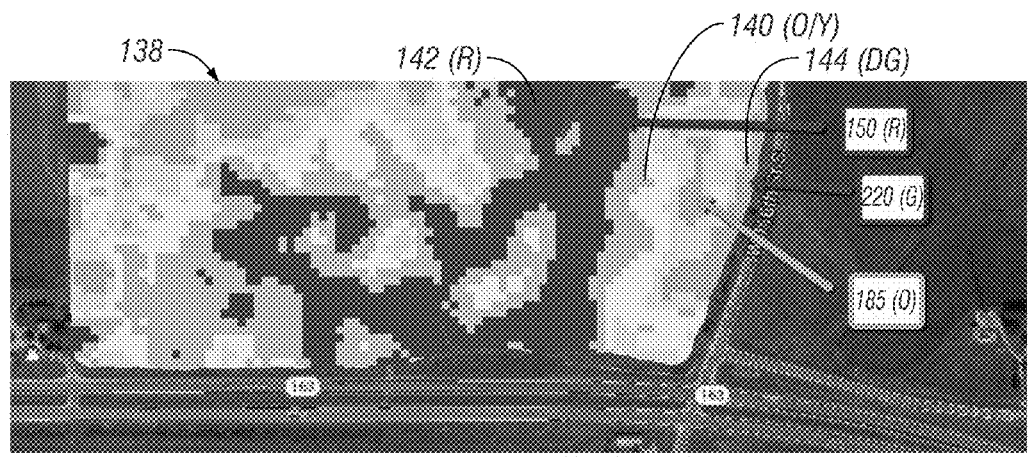
Figure 7:
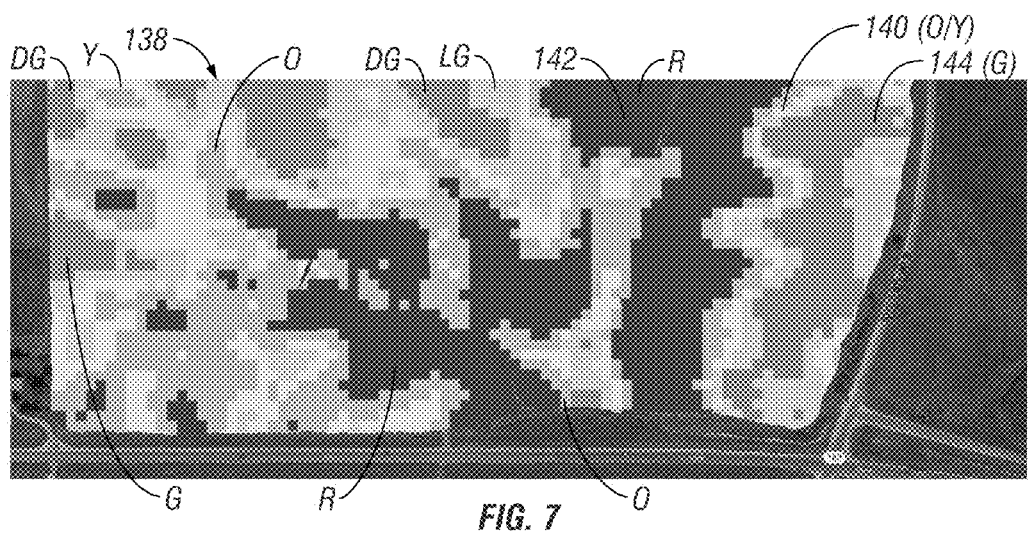

FIG. 5 illustrates a yield map 138 for a field (again a digital representation in aerial plan view on a digital display). There are various areas within the field having different yields in a given harvest year (the boundaries of which can indicated by visually or otherwise distinguishable graphics on the display). This includes areas 140, 142, and 144. Area 140 is a portion of the field which has not been harvested yet. Note, in this example, that area 142 has been determined (e.g. by a yield monitor) to have a yield of 150 bushels per acre and area 144 has a yield of 220 bushels per acre. In FIGS. 5-7, yield ranges are color-coded as follows: Dark green (G) highest (including 220 bu/ac); light green (LG) next highest; orange (O) next highest (including 185 bu/ac); yellow (Y) next highest; dark red (R) next highest (including 150 bu/ac). As can be seen, areas of like yields are more amorphous than FIGS. 3 and 4, but tend to occupy more contiguous sub-areas. For example most of the sub-area to the right of unharvested area 140 (white) is high yield (G), whereas most of the sub-area immediately to the left if low yield (R). The designer could elect to take an average yield from the entire harvested field to use as a multiplier for the calculated area of unharvested area 140. And this would be reasonable because adjacent harvested areas include highest measured yield and lowest. But, as mentioned, other criteria might be used by the designer to designate a yield multiplier for the unharvested area.

FIG. 6 is a yield map for a previous year for the same field. In this example, area 142 had a yield of 150 bushels per acre, area 144 had a yield of 220 bushels per acre, and area 140 had a yield of 185 bushels per acre. Thus, the bushels per acre increased from west to east within the field. FIG. 7 illustrates a yield map from a different previous year which also shows yield increases from west to east and that yield may start to drop off again on the far east side. This can be used by the designer. It can indicate a probability that in the present year the yield for the unharvested area 140 of FIG. 5 would likely at least be similar; i.e. higher yield to the west and lower yield to the east. But as can be seen by comparing FIG. 6 and FIG. 7, more of area 140 of the prior year of FIG. 7 had a higher yield (G) than the yield in the different prior year of FIG. 6 (a mixture of G, LG, and O). It may be that the designer uses more than present year yield data when selecting a yield multiplier for unharvested present year area 140.

F. Example 3

Figure 8:
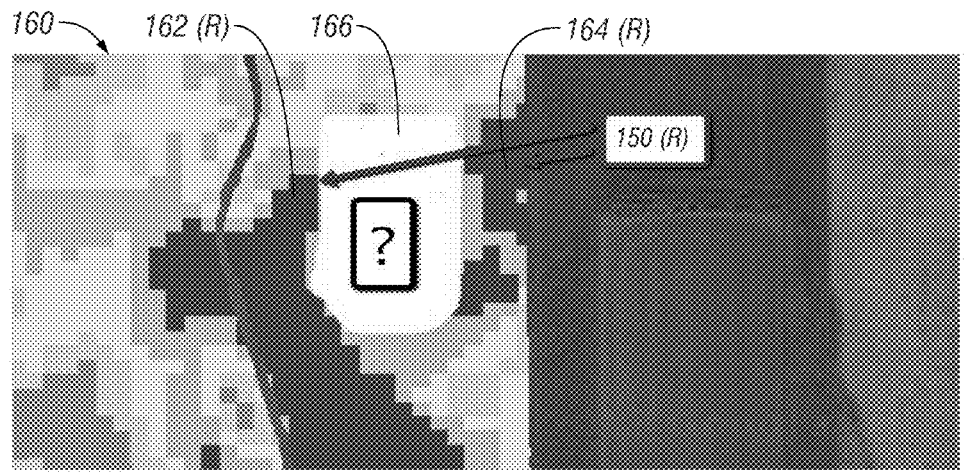
FIGS. 8-9 are digitized plan views of another field on a digital display which also illustrate yield maps for the another field.
Figure 9:
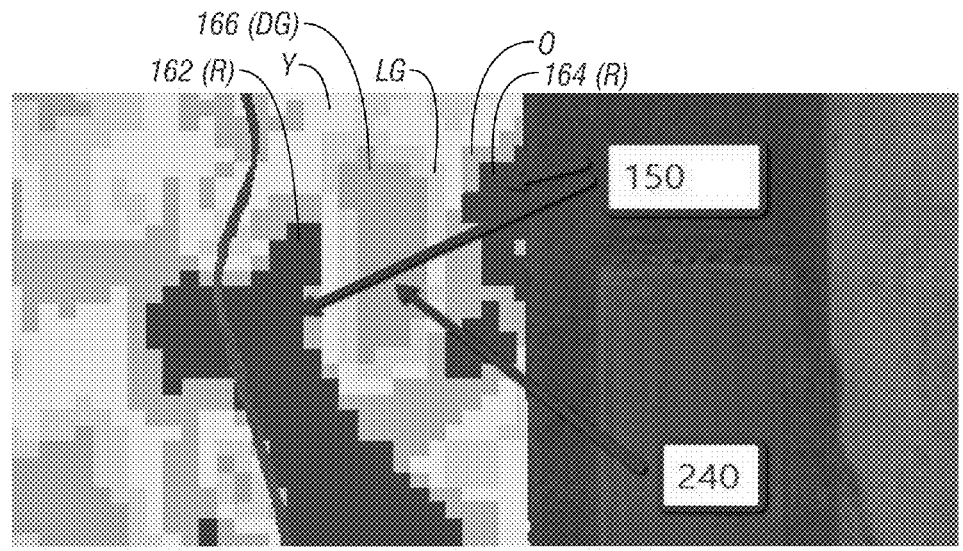

FIG. 8 and FIG. 9 illustrate a yield scenario for a different field 160. In FIG. 8 there is displayed an area to be harvested 166, with areas 162 and 164 on either side. Both area 162 and 164 show low yields (color coding is the same as FIGS. 3-7; (R) indicates red or low yield average of 150 bu/ac; orange (O) and yellow (Y) indicate higher yield, and light green (LG) and green (G) indicate highest. FIG. 9 illustrates the same field in a previous year where yield of area 166 is known. Here, areas 162 and 164 show low yields (150 bushes/acre or color (R)), but area 166 shows a relatively high yield (240 bushels/acre or color (G)).

Thus the field scenario shown in FIGS. 5-7 and FIG. 8-9 demonstrate how using previous yield data and other parameters can further help predict the yield that is remaining in certain areas of the field and avoid mistakes in estimating or predicting yield. By not only utilizing present year yield measurements of the harvested portion of the field, but also referencing one or more prior year yield measurements for any of the present year harvested or unharvested areas, additional robustness to the present year yield estimate for the unharvested area might be achieved, if the designer wants to use that additional information.

G. Example 4

Although the above examples have been primarily described with respect to the harvesting of a crop from a field, it is contemplated that similar processes may be used in other agricultural processes. In particular, the feature may be used in reverse to predict how much product is left to apply in a particular field. Examples of products include, without limitation, fertilizer, herbicide, insecticide, lime, manure, and seed. Thus, tendering personnel would be informed how much additional product needs to be brought to field. In such an application, the system may take into account the flat rate being applied or a prescription that is being applied to predict the amount of product remaining. These parameters or values are typically available in present day machines associated with at least some of the products and appropriate applicators for them listed above.

One such process is providing agricultural inputs to a field such as seed or fertilizer or pesticides. In such processes a determination is needed to determine an area of field left to be planted or treated or to have inputs otherwise applied to. In addition, there are rates of application to be taken into consideration which can vary based on different factors. Instead of removing product from the field, in these situations the concern is bringing the necessary product to the field such as the required amount of seed or chemicals. By being able to determine when additional inputs are necessary, these inputs may be conveyed to the field or appropriate locations within the field in order to avoid delays in applying the inputs.

Thus, for example, the area prediction feature may be useful for planting operations by indicating to the operator how many acres are left to be planted and calculating if the planter has enough seed or not. This can be accomplished by using scales on the planter, a static population rate, or calculating what the planting prescription requires for a rate to plant a remainder of a particular field, or a pass/round. This area prediction feature may be useful for other types of applications as well including tillage operations and application operations in order to assist an operator in better understanding when exactly they will be finished within a field.

All of this can be done on one dedicated display and/or multiple mobile devices.

H. Example 5

Figure 10:
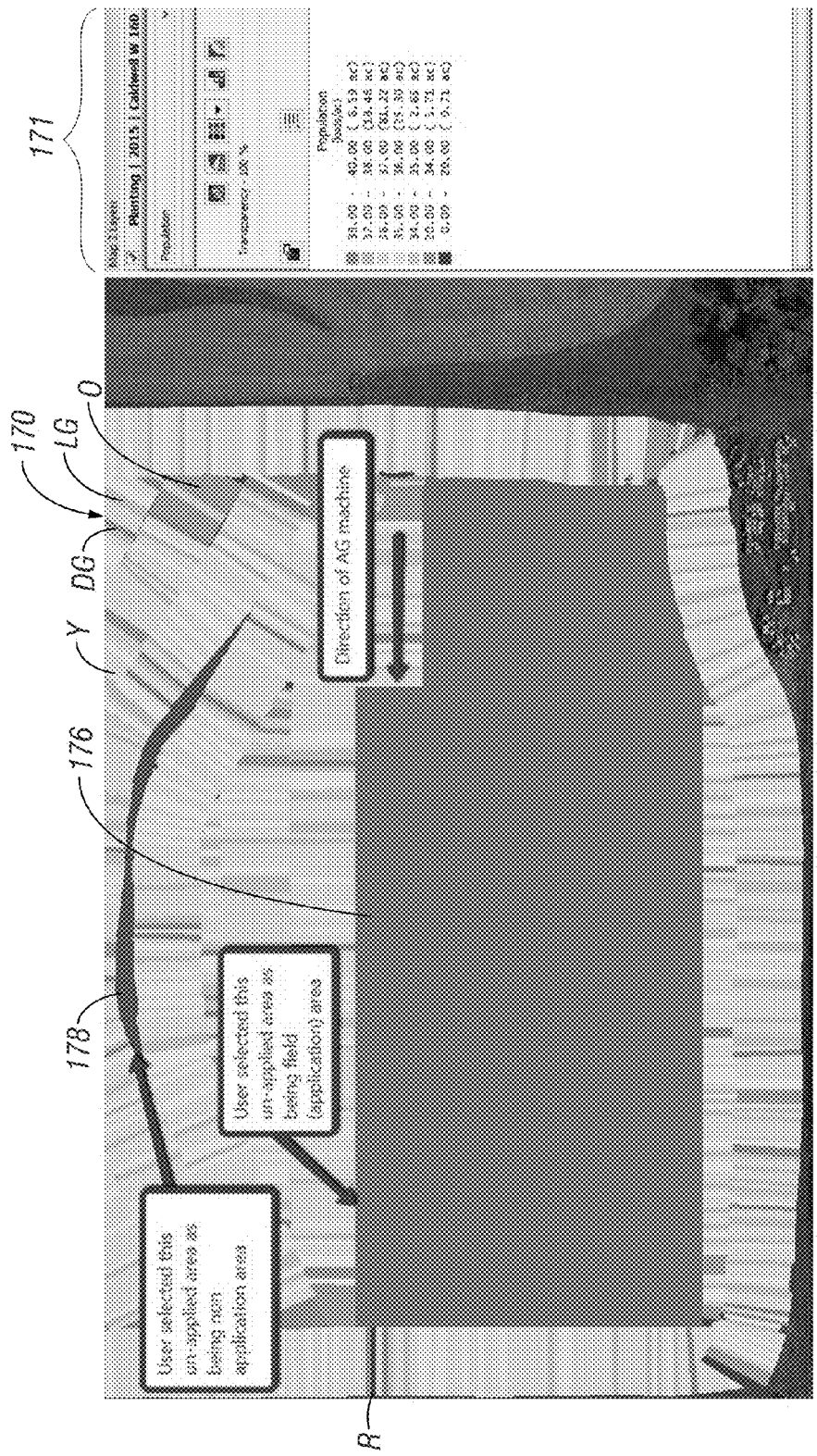
FIG. 10 is a digitized plan views of a field on a digital display which also illustrates ability of the user to enter user-selectable areas on the display which are either designated or undesignated parts of the field for purposes of use in estimations according to one or more aspects of the invention.

Additional aspects according to the invention are illustrated at FIG. 10. A monitor or other display is configured to produce a digital representation of an aerial plan view of a field 170, like FIGS. 3-9.

In this example, the user has the ability to select "areas" of field 170 that are surrounded by coverage areas (or a physical boundary) to indicate it/they is/are part of the covered area or not. This allows the user to select the large substantially rectangular (dark green) part 176 of field 170 as an area of the field that needs to be harvested or product applied to it. In this example of FIG. 10, the map is an "as applied" map of a planter planting through a field. The right side 171 of the display includes the following color key:

| Color | Population (ksds/ac) | Area in Field (ac) |
|---|---|---|
| Dark Green (G) | 38.00–40.00 | 6.59 |
| Light Green (LG) | 37.00–38.00 | 13.46 |
| Yellow-Green (YG) | 36.00–37.00 | 31.22 |
| Yellow (Y) | 35.00–36.00 | 25.30 |
| Orange (O) | 34.00–35.00 | 2.65 |
| Dark orange (DO) | 20.00–34.00 | 5.71 |
| Red (R) | 0–20.00 | 0.71 |

Where: "ksds" = thousands of seeds per acre and "ac" = acre.

The legend shows how many acres are planted to the corresponding seed population. It shows a user can select a polygon, or other outlined or indicated area on the map (e.g. the red area indicating a terrace 178), to tell the system not to include this in the area calculation.

As can be further appreciated, this technique could be used in analogous ways for other precision farming operations. For example, the system could provide a map or prescription for the precision farming controller to follow when the appropriate machine traverses the field. The machine could be a planter. Each row unit of the planter could have a seed meter with variable rate control. The precision farming controller could be configured to send instructions to each seed meter according to the "prescribed" seed deposition rate per area (population per area) in thousands of seeds per acre, depending on where each row unit is positioned at each point in time as the planter is moved through the field.

User-selection of large rectangular area 176 could involve another utilization of this user-selectability. With some form of human-machine interface (e.g. pen or touch screen input to the display, or other software enabled drawing tool), the user could draw or otherwise designate on the map where operations on or in the field are needed or desired. By straight-forward calculations (as described earlier), once the user has indicated the outer boundary of area 176, its total area can be calculated, or the system automatically calculates this area. The system can do this by assuming all area within the already applied/harvested swath widths is area that is yet to be covered (e.g. the green area in FIG. 10) The user does not have to draw this out. The system is smart enough to know that the user is going to cover everything that is within swath widths of already applied area. An exception to this is the red area which here is called a "terrace" 178. The system would not know this is not farmable so the user could easily tap this section of the field and mark it as non-farmable so it does not get taken into consideration for the area calculation. In the example of seed population prescriptions, based on some mathematical evaluation of either what has occurred regarding ksds/ac on parts of field 170 already planted and/or some evaluation of a prescription intended for the whole field, a calculation of what total number of seeds or other resources is yet needed to complete planting of designated unplanted area 176 can be made (e.g. total area of area 176 in acres (ac) times ksds/ac prescribed for that area 176 or otherwise some estimated or averaged ksds for that total area). If a prescription already exists with pre-determined ksds/ac resolution for area 176 like that of the areas of field 170 outside area 176, a quite accurate estimation of total additional seeds needed to complete planting could be made. If some other estimate of ksds/ac for area 176 is made of less resolution, the accuracy would diminish. However, as discussed before, it can still be acceptable. Such a less accurate estimation of how much additional seed will be needed to complete planting of the field may still be sufficient to inform efficient logistics planning for such things as efficient resource use for getting the needed amount of seeds to the planter. So some margin of error can still be beneficial. And, of course, this example of user-selection of areas of the field still needing operations can be applied in analogous ways to applying products other than seed. One example is fertilizer. Prescription maps for variable rate fertilizer application are well-known in the art. And extension of this technique to other products in similar ways is of course possible. Knowledge or estimation of application rate per given unit of area allows estimation of how much additional product is needed to complete the field. Still further, this technique can be applied in analogous ways to removing things from the field. In the case of harvesting, user-selection of boundaries of what is yet to be harvested, coupled with knowledge or estimates of likely yield for it, allow estimation of how much harvested crop is likely to be obtained to finish the field (or at least the designated area), and can be used to inform the decision-makers (whether on the harvester, in a transport vehicle, or at another relevant location) of that estimation and then allow decisions for efficient allocation of resources for getting the harvested product out of the field and then storage, sale, or other use.

FIG. 10 illustrates another feature of this user-selectability. FIG. 10 also shows how the user selected a terrace (the relatively thin curved area 178 above rectangular area 176 shown in red) as an area of the field that is a non-application area. For example, it can mean it will not be harvested or product (e.g. seed, fertilizer, etc.) will not be applied there. This allows the system to calculate a more accurate instantaneous total area.

As such, instead of designating areas needing further work (like area 176 discussed above), the user can by the same or similar techniques (e.g. human-machine interface including but not limited to drawing ability on the display), outline the boundary (and/or fill in an area) on the displayed field map were operations are not to be conducted. As indicated in FIG. 10, this can inform a planter to stop planting seeds in that area. It can inform a harvester there will be no crop harvester from that area. And it can be used in the estimations of either what additional product is needed to finish a field or what additional crops will likely be harvested from the field by more accurately showing the system the total relevant area of the field. In other words, by informing the system of areas in the field that are not relevant, more accurate estimations are possible when using looking at such things as total field area or averaging some parameter (e.g. average yield) to help estimate what is left to apply or harvest.

Thus, a precision ag display or mobile device can quickly calculate the area remaining by assuming all area within an already harvested/applied area is area that is left to be harvested/applied, unless user signifies an exception (like in FIG. 10 indicating a terrace.)

I. Options and Alternatives

As will be appreciated by the foregoing by those skilled in the art, the invention can take various form and embodiments. Variations obvious to those skilled in the art will be included within the invention which is defined by the appended claims hereto.

Some of those alternatives and options have been mentioned above. Another example is the type of operation to be performed at the field. Removing or adding functions include but are not limited to harvesting and applying substances (e.g. fertilizer, etc.).

Another possibility is crop-sensing operations. A variety of different crop sensing operations are well-known to those skilled in the art. Sensors carried on a vehicle (e.g. land-based or aerial) interrogate soil or plants in a field and analyze returned information to derive such things as soil characteristics or plant traits. An example is the OptRx® crop sensors commercially available from Ag Leader Technology of Ames, Iowa (USA), which directs light energy onto the field or plants and receives and evaluates reflectance of that light. By spectroscopic calibration and evaluation techniques, this non-destructive, remote sensing can inform the user in real time about the characteristics, traits, or conditions of field or crop in the field. Maps can be created by scanning the field for later use. All this can be used to then inform the user or precision agriculture system of such things as fertilizer application rates and type(s).

Therefore, in analogous ways to described above about estimating remaining area of field for field operations, the present invention can be applied to crop or field sensing. For example, such sensors could be operatively installed on a sprayer. Crop, soil, or other field-related sensing can be obtained and stored as the sprayer moves through the field. At any time, the sprayer operator could estimate what area of the field remains to be sprayed and, based on the data from the sensors, estimate such things as how much more spray needs to be hauled out to the sprayer (or otherwise is needed to complete the field), including by calculations based on such things as average application rate so far. It could optionally include adjustment based on what the sensors indicate about the soil or plants closest to the area yet to be sprayed, or on the same sensed measurements from one or more past years. The information could also be communicated to other interested parties (e.g. persons responsible for hauling more spray to the sprayer, suppliers of additional spray, management, suppliers of other substances for future operations in the field, etc.) For example, if the sprayer is applying herbicide in this pass through the field, but at the same time sensing such things as nitrogen content of the soil or in emerged plants in the field, that nitrogen information could allow the user or others to whom it is communicated to plan logistics for amount and rate of application of nitrogen fertilizer application operations on the field during another pass through the field. Those skilled in the art will appreciate how the invention can be applied to a variety of field operations.

What is claimed is:

1. A method for managing agricultural operations by predicting amount of crop or product remaining for a field, the method comprising:
   performing agricultural operations on at least a portion of a field using an agricultural machine;
   sensing data associated with the agricultural operations using sensors associated with the agricultural machine wherein the sensors comprise one or more of:
   a. a yield monitor;
   b. an application rate sensor; or
   c. a crop sensor;
   communicating the data associated with the agricultural operations to a computing device wherein the computing device comprises:
   a. a precision agricultural system and display; or
   b. a dedicated computer and display;
   analyzing the data associated with the agricultural operations performed using the computing device to determine an area prediction for a remaining portion of the field upon which the agricultural operations are to be performed;
   using the area prediction value for the remaining portion of the field by the computing device to determine (a) a time value associated with completing the agricultural operations for the field or (b) an amount of material value associated with completing the agricultural operations for the field wherein the area prediction comprises:
   a. providing a digital field map related to the field;
   b. allowing through a human-machine interface drawing or indicator tool or precision agricultural system designation on the field map of area(s) of the field upon which the agricultural operations(s) have been performed versus area(s) upon which the agricultural operation have not been performed;
   c. calculating the area prediction on the computing device based on the field map designations; or
   d. calculating an area remaining by assuming all area within an already harvested or applied area is an area left to be harvested or applied, unless a user signifies an exception.

2. The method of claim 1 further comprising displaying the time associated with completing the agricultural operations for the field or the amount of the material associated with completing the agricultural operations for the field at a display associated with the agricultural machine.

3. The method of claim 1 further comprising wirelessly communicating the time associated with completing the agricultural operations for the field or the amount of material associated with completing the agricultural operations for the field one at a time or concurrently to one or more wireless devices either at the machine or remote from the machine to assist with logistics relative the field and other management decisions.

4. The method of claim 1 further comprising wired or wirelessly receiving additional data at the computing device and using the additional data in determining the time associated with completing the agricultural operations for the field or the amount of material associated with completing the agricultural operations for the field.

5. The method of claim 1 further comprising using historic data at the computing device and using the historic data in determining the time associated with completing the agricultural operations for the field or the amount of material associated with completing the agricultural operations for the field.

6. The method of claim 1 further comprising determining the amount of the crop or product remaining for the field at least partially based on the area prediction and/or historical data for the field including one or more of:
   a. pre-designated areas upon which no operations are to be performed;
   b. crop sensing information;
   c. a yield monitor measurement;
   d. an application rate measurement.

7. The method of claim 2 further comprising determining a number of vehicle loads associated with the agricultural operations to be performed on the remaining portion of the field.

8. The method of claim 1 further comprising determining resources for use in the agricultural operations to be performed on the remaining portion of the field by one or more of an operator of the machine or a remote person or entity.

9. The method of claim 5 wherein the historical data is accessible through a cloud-based server.

10. The method of claim 1 wherein the agricultural operations are selected from a set consisting of harvest operations, planting operations, spraying operations, fertilizing operations, pesticide operations, and crop sensing operation.

11. A method for managing harvest operations by predicting amount of crop for a field, the method comprising:
   performing harvesting operations on at least a portion of a field using a harvesting machine;
   sensing data associated with the harvesting operations using sensors associated with the harvesting machine wherein the sensors comprise one or more of:
   a. a yield monitor; or
   b. a crop sensor;
   communicating the data associated with the harvesting operations to a computing device;

determining an amount of harvested material associated with completing the harvesting operations for the field using the computing device wherein the computing device comprises:
   a. a precision agricultural system and display; or
   b. a dedicated computer and display;
determining an amount of harvested material onboard the harvesting machine and communicating the amount of harvested material onboard the harvesting machine to the computing device;
determining an amount of harvested material stored in one or more agricultural vehicles and communicating the amount of the harvested material stored in the one or more agricultural vehicles to the computing device; and
using the amount of harvested material associated with completing the harvesting operations, the amount of harvested material onboard the harvesting machine, and the amount of harvested stored in one or more agricultural vehicles to determine at least one of a time to complete the harvesting operations and remove the harvested material from the field to a destination, a number of wagon loads associated with removing the harvested material from the field to the destination, and a number of truck loads associated with removing the harvested material from the field to the destination.

12. The method of claim 11 further comprising displaying at a display associated with the harvesting machine at least one of the time to complete the harvesting operations and remove the harvested material from the field to a destination, the number of wagon loads associated with removing the harvested material from the field to the destination, and the number of truck loads associated with removing the harvested material from the field to the destination.

13. The method of claim 11 further comprising wired or wirelessly communicating to a wireless device at least one of the time to complete the harvesting operations and remove the harvested material from the field to a destination, the number of wagon loads associated with removing the harvested material from the field to the destination, and the number of truck loads associated with removing the harvested material from the field to the destination.

14. The method of claim 11 further comprising wired or wirelessly receiving additional data at the computing device and using the additional data to in determining the time associated with completing the agricultural operations for the field or the amount of material associated with completing the agricultural operations for the field.

15. The method of claim 11 further comprising using historic data at the computing device and using the historic data in determining the amount of harvested material associated with completing the harvesting operations for the field using the computing device.

16. The method of claim 11 wherein the determining the amount of harvested material associated with completing the harvesting operations for the field using the computing device is at least partially based on area prediction.

17. The method of claim 11 wherein the determining the amount of harvested material associated with completing the harvesting operations for the field using the computing device is at least partially based on historical data for the field.

18. The method of claim 17 wherein the historical data is accessed through a cloud-based server.

19. A system for managing agriculture operations by predicting amount of crop or product remaining for a field, the system comprising:
   a. an agricultural machine capable of traversing the field;
   b. one or more sensors on-board the machine capable of sensing data associated with the agricultural operations wherein the sensors comprise one or more of:
     i. a yield monitor;
     ii. an application rate sensor; or
     iii. a crop sensor;
   c. a mobile communications device associated with an operator of the machine;
   d. one or more additional mobile communication devices associated with one or more interested parties or entities;
   e. a computing device wherein the computing device comprises:
     i. a precision agricultural system and display, or a dedicated computer and display;
     ii. in communication with the one or more sensors to receive the sensing data;
     iii. adapted to analyze the data related to one or more of:
       (1) agricultural operations performed on the field;
       (2) historical data about the field;
       (3) crop sensing data;
     iv. a calculation of an area prediction for a remaining portion of the field upon which the agricultural operations are to be performed;
     v. a display of an indication of the area prediction;
   f. a communications link between at least two of the mobile communications device and additional mobile communications devices;
   g. so that the area prediction can be utilized to instruct or plan for logistics related to managing the agricultural operations.

20. The system of claim 19 wherein:
   a. the agricultural machine comprises:
     i. a harvester;
     ii. an agricultural product applicator; or
     iii. an aerial device;
   b. the sensor comprises:
     i. a yield monitor;
     ii. an application rate sensor; or
     iii. a crop sensor;
   c. the mobile communications device comprises:
     i. a cell phone;
     ii. a tablet computer with a communications module;
     iii. a lap top computer with a communications module;
     iv. a wired phone; or
     v. a two way radio;
   d. the communications link comprises:
     i. a cellular network;
     ii. a radio network;
     iii. a landline network; or
     iv. the internet; and
   e. the logistics are related to:
     i. transport vehicles to supply the machine or carry products from the machine;
     ii. a remote supplier or storage facility; or
     iii. a management entity.

\* \* \* \* \*